United States Patent [19]

Bennett et al.

[11] Patent Number: 4,714,489
[45] Date of Patent: Dec. 22, 1987

[54] VACUUM PRESS CONSTRUCTION

[75] Inventors: Terry A. Bennett, Monroeville, Pa.; James E. Carino, Evansville, Ind.

[73] Assignee: PPG Industries, Inc., Pittsburgh, Pa.

[21] Appl. No.: 616

[22] Filed: Jan. 5, 1987

[51] Int. Cl.⁴ .............................................. C03B 23/02
[52] U.S. Cl. ........................................ 65/104; 65/106; 65/273; 65/115
[58] Field of Search ................ 65/104, 106, 273, 290, 65/291, 115

[56] References Cited

U.S. PATENT DOCUMENTS

| | | | |
|---|---|---|---|
| 3,469,963 | 9/1969 | Beattle | 65/115 |
| 3,819,351 | 6/1974 | Shaffer et al. | 65/273 |
| 4,187,095 | 2/1980 | Frank | 65/104 |
| 4,319,907 | 3/1982 | Pike | 65/106 |
| 4,508,556 | 4/1985 | Bennett et al. | 65/106 X |

Primary Examiner—Arthur Kellogg
Attorney, Agent, or Firm—Andrew C. Siminerio

[57] ABSTRACT

A vacuum press construction having holes on the press face corresponding to aperture in the glass sheet to be shaped. The holes are sealed in a manner so as to minimize the amount of heat drawn from the periphery of the glass sheet apertures during the pressing operation and maintain glass edge strength at the aperture.

18 Claims, 3 Drawing Figures

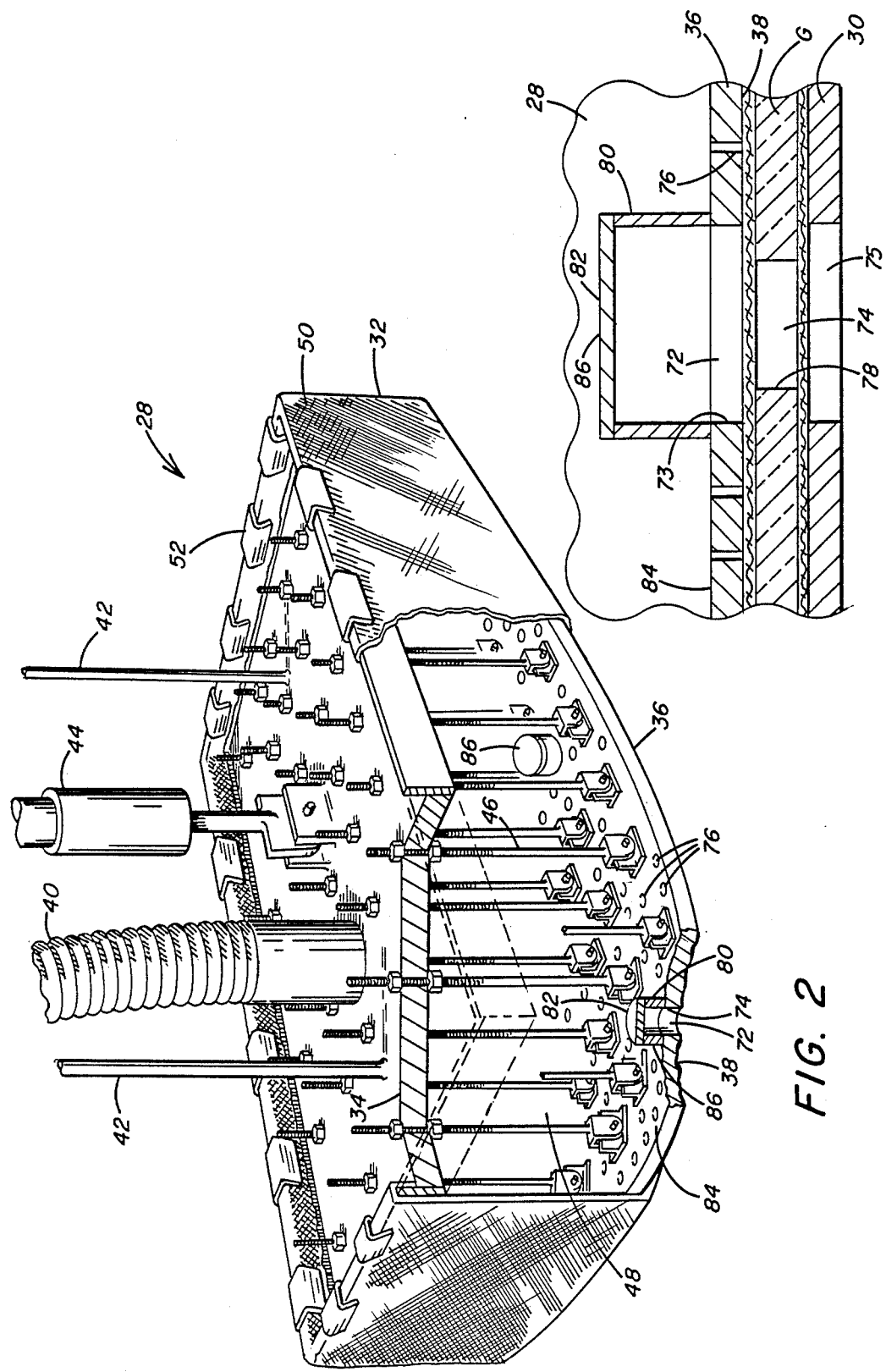

VACUUM PRESS CONSTRUCTION

BACKGROUND OF THE INVENTION

1. Field of the Invention

This invention relates to the press bending of heat softened sheets and in particular to a vacuum mold for press bending heat softened apertured glass sheets.

2. Technical Considerations

Shaped and tempered glass sheets are widely used as side windows or rear windows in vehicles such as automobiles or the like. To be suitable for such applications, flat glass sheets must be shaped to precisely defined curvatures dictated by the shape and outline of the frame defining the window opening into which the windows are installed. It is also important that these windows meet stringent optical requirements and that the windows be free of optical defects that would tend to interfere with clear viewing therethrough in the viewing area.

In a typical commercial operation for the production of shaped glass sheets, a glass sheet is conveyed along a substantially horizontal path that extends through a tunnel-type furnace where the glass sheet is one of a series of sheets that are heated to the softening temperature of the glass and then along an extension of the path into a shaping station where each glass sheet is engaged by and pressed between a pair of shaping molds. The upper shaping mold may be a vacuum mold with an apertured sheet engaging surface so that a vacuum can be drawn through the mold to hold the heat softened sheet by suction. After shaping, a transfer and tempering ring having an outline shape conforming to that desired for the glass sheet slightly inboard of its perimeter moves upstream into a position below the shaping mold. The vacuum releases and deposits the glass sheet onto the tempering ring. The tempering ring supports the peripheral edge of the glass sheet while it conveys the shaped glass sheet into a cooling station where it is cooled in a controlled manner to a temperature below the annealing range of the glass.

Apertured glass sheets may cause problems when formed by press bending and in particular, when pressed between a pair of high heat capacity bending molds. The absence of glass due to the apertures in the glass provides a void that is not contacted by a corresponding portion of the mold surface. It is believed that this non-contacted portion of the mold tends to draw additional heat away from the perimeter portion of the aperture. As a result, the temperature of the glass around the periphery of the aperture is less than that of the remainder of the glass. With such an arrangement, when the glass is cooled for tempering, the periphery of the aperture develops a lesser temper than the remaining portions and this increases the occurrence of venting and breakage at the apertures.

U.S. Pat. No. 4,319,907 to Pike teaches a solution to this problem for shaping apertured glass sheets in a vertical press bending operation wherein the heat transfer capacity of the mold in the vicinity of the apertures is reduced. In particular, the mold surface is provided with holes aligned with the apertures in the glass, these holes in the mold surface being slightly larger than the glass apertures in the glass. Since that portion of the mold surface that would have been adjacent the apertures in the glass has been removed, there is no structure that will draw additional heat from the periphery of the aperture so as to effect its temper upon cooling. The resulting heat transfer at the glass sheet aperture during pressing improves the stress pattern around the peripheral portions of the glass sheet apertures.

If the arrangement of U.S. Pat. No. 4,319,907 were used in a vacuum mold as is typically employed in a horizontal press bending operation, the large holes in the press face would require a large volume of air to be drawn through the vacuum mold in order to hold the bent glass sheet thereagainst. In addition, the volume of air drawn through the hole in the mold may adversely cool the peripheral edge of the glass aperture prior to tempering, thus reducing its tempered properties and resulting in additional venting and breakage. Furthermore, the increased volume of air drawn through the hole necessary to hold the glass sheet against the mold surface may also deform the glass sheet aperture about its periphery.

It would be advantageous to have a vacuum mold capable of shaping apertured glass sheets without adversely affecting the peripheral edge of the apertures so as to reduce venting and breakage and maintain the proper bent shape at the glass sheet aperture.

SUMMARY OF THE INVENTION

An object of this invention is to provide a press bending arrangement for shaping apertured glass sheets. A heat softened sheet is sandwiched between a pair of vertically aligned shaping molds. The upper vacuum mold includes an apertured lower wall having a sheet engaging surface conforming to the final desired shape of said sheet and the lower mold includes an engaging surface complementing at least a portion of the sheet engaging surface of the first mold. A vacuum is drawn through the vacuum mold to hold the shaped glass sheet against its engaging surface after pressing. The engaging surface of the vacuum mold is provided with holes positioned adjacent, and in facing relation to, any apertures in the heat softened glass sheet. A sealing arrangement seals the holes in the engaging surface to prevent vacuum from being drawn therethrough. The edge of the holes in the engaging surface is preferably spaced radially outward from the edge of the apertures in the heat softened glass.

In one particular embodiment of this invention the sealing arrangement includes a hollow stack member with a first end secured to the inner surface of the lower wall and a cap member secured to the opposite end, wherein the stack extends away from the engaging surface of the lower wall.

A further object of this invention is to provide a method of shaping a heat softened glass sheet having at least one aperture. A hole is provided in the shaping surface of a vacuum mold and a heat softened glass sheet is positioned relative to the shaping surface of the vacuum mold to align the hole in the shaping surface with the aperture in the glass sheet. The glass sheet is engaged by the shaping surface and a vacuum is drawn through the vacuum mold to hold the shaped glass sheet thereagainst. The hole in the shaping surface is sealed so as to prevent vacuum from being drawn therethrough.

Removing a portion of the shaping surface of the vacuum mold adjacent the apertures in the glass sheet by providing holes in the shaping surface aligned with the apertures, as well as sealing the holes to prevent air from being drawn therethrough, prevents loss of strength about the edge of the apertures dye to premature cooling and inadequate tempering. The hole in the shaping surface reduces the amount of heat drawn away from the glass edge during pressing and the sealing of the holes prevents air from being drawn passed the edge and through the hole, into the vacuum mold so as to check any cooling effect that the air may have on the glass edge.

BRIEF DESCRIPTION OF THE DRAWINGS

FIG. 2 is a fragmentary perspective view of the upper vacuum mold illustrated in FIG. 1 incorporating the present invention.

FIG. 3 is a cross-sectional view of an upper vacuum mold and a lower mold engaging a glass sheet therebetween illustrating the stack and cap arrangement of the present invention in the upper vacuum mold.

DETAILED DESCRIPTION OF THE INVENTION

Figure 1:
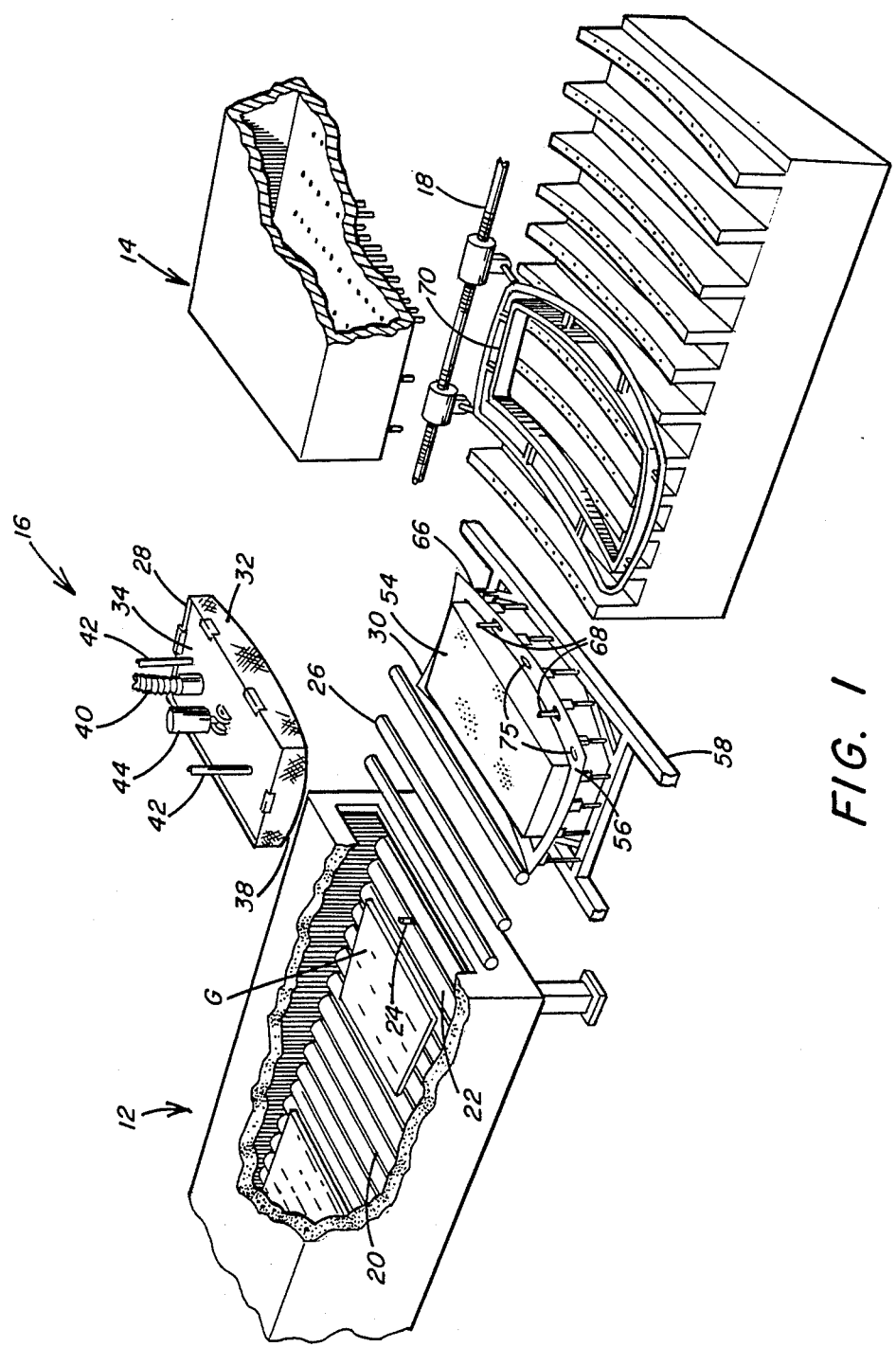
FIG. 1 is a side view of a press bending arrangement with an upper vacuum mold incorporating the present invention.

The present invention is presented with respect to its use in the vacuum mold of a horizontal press bending operation similar to that taught in U.S. Pat. No. 4,508,556 to Bennett et al which teachings are hereby incorporated by reference, wherein a glass sheet is pressed between an upper full surface mold and a lower ring mold, but it should be understood that the present invention may be used in any press bending operation for shaping sheet material wherein at least one of the press bending molds is a vacuum mold, for example as disclosed in U.S. Pat. No. 4,187,095 to Frank.

Referring to FIG. 1, an apparatus for treating and shaping sheets of heat softenable materials such as glass includes a furnace 12 through which glass sheets G are conveyed from a loading station (not shown) while being heated to a glass deformation temperature. A cooling station 14 for cooling the curved sheets of glass and an unloading station (not shown) beyond the cooling station 14 are located in end-to-end relation to the right of the furnace 12. An intermediate or shaping station 16 is disposed between the furnace 12 and the cooling station 14. A sheet transfer means 18 located in the cooling station 14 transfers the shaped and tempered glass sheet downstream for transport to the unloading station.

The furnace 12 includes a horizontal conveyor 20 comprised of longitudinally spaced transversely extending conveyor rolls 22 that define a path of travel that extends through the furnace 12 and the shaping station 16. The rolls 22 of the conveyer 20 are arranged in sections and their rotational speeds controlled through clutches so that the speed of each conveyor section may be controlled and synchronized in any convenient manner. A glass sensing mechanism 24 determines the location of a glass sheet G by, for example, an optical or electrical glass sensing device. The sensing mechanism 24 initiates operation of a programmable controller (not shown) which controls the sequence of the pressing operation as will be discussed later.

Immediately beyond the exit end of the furnace 12 are a plurality of transfer rolls 26 which bridge the gap between the exit end of the furnace 12 and the shaping station 16. The transfer rolls 26 are located in such a position as to define a continuation of the path of travel defined by furnace conveyor rolls 22.

The shaping station 16 includes an upper vacuum mold 28 and a lower ring mold 30, the former being the subject of this invention. The upper mold 28 may be covered with a refractory cloth cover 32 such as fiber glass, to insulate the glass sheet G from the mold 28. As shown in FIG. 2, the upper mold 28 has a rigid upper mounting plate 34 and a flexible apertured lower wall 36. The lower wall 36 provides a shaping surface 38 conforming to the shape desired for the glass sheet to be shaped. Referring to FIGS. 1 and 2, the upper vacuum mold 28 which communicates with a vacuum source (not shown) through an evacuation pipe 40 and a suitable valve (not shown) is suitably connected through upper vertical guide rods 42 to a support frame (not shown) and is vertically movable via a piston arrangement 44 relative to the frame. The evacuation tube 40 may be connected through a suitable valve arrangement to a source of pressurized air (not shown). The valves for the vacuum line and for the pressure line may be synchronized according to a predetermined time cycle in a manner well known in the art.

Referring to FIG. 2, the lower wall 36 of the upper vacuum mold 28 is connected to the upper mounting plate 34 through a plurality of adjustable connectors 46. The open edge area between the mounting plate 34 and lower wall 36 is sealed with a non-porous heat resistant material to form a central vacuum chamber 48. In the particular embodiment illustrated in FIG. 2, fiberglass cover 32 is drawn across the apertured lower wall 36 with portions 50 spanning between the plate 34 and wall 36 and removably fastened to the plate 34 by clamps 52 or any other convenient means. The portion 50 is coated with a heat resistant silicone rubber, for example, Dow Corning 736 Silastic ® RTV or any other heat resistant sealant to prevent air flow therethrough and form a pliable vacuum seal. When a vacuum is drawn in the chamber 48 through the evacuating pipe 40, the coated fiberglass cloth seals the space between the plate 34 and wall 36 so that air enters the chamber 48 only through the apertured lower wall 36.

Referring to FIG. 1, the lower ring mold 30 surrounds an auxiliary gas hearth bed 54, and has an upper shaping surface 56 that generally complements a portion of the surface 38 of flexible apertured wall 36. The lower ring mold 30 is supported on a rigid reinforcing frame 58. Elevator means (not shown) is provided to raise and lower the rigid reinforcing frame 58 together with the lower ring mold 30.

A pair of stop members 68 is provided in longitudinally spaced relation along the downstream portion 66 of the lower ring mold 30 to position a glass sheet on the lower ring mold 30 as it passes over the gas hearth 54 in a manner similar to that disclosed in U.S. Pat. No. 4,529,433 to Bennett et al.

In operation, a series of spaced glass sheets are conveyed through the furnace 12 and heated to their heat softening temperature. When a leading edge of the glass sheet G reaches a position at which it is detected by the glass sensing mechanism 24, the programmable controller (not shown) is activated and the glass sheet is conveyed over the transfer rolls 26 and onto a position above the auxiliary gas hearth bed 54. The lower ring mold 30 moves vertically upward and engages a perimeter portion of the glass sheet G and forces it up against the downwardly facing shaping surface 38 of the upper vacuum mold 28 to sandwich the glass sheet G therebetween. As the lower ring mold retracts, a vacuum drawn through the upper vacuum mold 28 holds the shaped glass sheet thereagainst. The sheet transfer means 18, in the form of a tempering ring 70, is positioned below the shaped glass sheet held up against the upper vacuum mold 28. The vacuum is then discontinued and the glass G sheet is deposited on the tempering ring 70 which transfers the shaped glass sheet into the cooling station 14 where it is cooled and tempered.

Referring to FIG. 3, the shaping surface 38 of the upper vacuum mold 28 in the present invention is provided with holes 72 aligned with apertures 74 in the shaped glass sheet G. Although not limiting in the present invention, the holes 72 are slightly larger in diameter than the glass apertures 74, which may be as large as 1 inch (2.54 cm) in diameter or greater. In a preferred embodiment of the invention, edge 73 of hole 72 is spaced approximately 1/4 inch (0.64 cm) radially outward from edge 78 of the aperture 74. Oversizing hole 72 relative to aperture 74 serves two purposes. First, it allows for alignment variation between the glass sheet G and shaping molds 28 and 30 while still maintaining alignment between holes 72 and aperture 74. Second, it provides non-contact between the edge 78 of the aperture 74 and the apertured wall 36 so as to ensure that excess heat is not drawn from the edge 78 and adversely affect its temperature and subsequent tempered properties relative to the remaining glass. It should be noted that in the particular embodiment illustrated in FIGS. 1 and 3, lower ring mold 30 is also provided with a hole 75 aligned with glass sheet aperture 74. The diameter of the hole 75 is larger than that of the aperture 74 for reasons similar to that discussed, supra, with respect to the hole 72 in wall 36.

Since the aligned holes 72 in the upper vacuum mold 28 may be significantly larger than the apertures 76 in the flexible apertured wall 36, which typically may be within a range of 1/8 to 3/16 inches (0.32 to 0.95 cm), the amount of air drawn through the upper vacuum mold 28 necessary to hold the glass sheet G thereagainst will have to be increased. In addition, air drawn through the hole 72 will tend to cool the periphery of the glass sheet apertures 74 so that its temperature is lower than the remainder of the glass sheet G. As a result, when the glass sheet is cooled for tempering, the temper developed about the edge 78 is less than that of the remaining glass and thus may increase occurrence of venting and breakage.

To avoid this condition, the holes 72 in the upper vacuum mold 28 are sealed from the vacuum. In a particular embodiment of the invention illustrated in FIGS. 2 and 3, a stack 80 with a cap 82 is secured to the inner surface 84 of the flexible apertured wall 36 such that air drawn through the upper vacuum mold 28 cannot be drawn through the hole 72. Care must be taken when sizing and positioning capped stack arrangement 86 so that any heat drawn from the glass and into the capped stack arrangement 86 will not significantly reduce the temperature of the glass at that location and adversely affect its tempered properties. The capped stack arrangement 86 may be constructed of low heat capacity materials or of thin metal. In addition the cap 82 of the arrangement 86 should be positioned away from the apertured wall 36 to further reduce the potential of heat being drawn away from edge 78 of aperture 74. Although not limited in the present invention, the height of the capped stack arrangement should be on the order of approximately 50 percent or more of the hole 72 diameter. In one particular embodiment of the present invention where the aperture 74 is circular, a cylindrically shaped capped stack arrangement 86 constructed from 1/16 inch (0.16 cm) thick steel is welded to and positioned about the perimeter edge 78 of the hole 72 in a 3/16 inch (0.95 cm) thick steel, apertured wall 36. As a result, there is no flow of air through the hole 72 that may adversely affect the aperture 74 in the glass sheet G, thus increasing the temper about the peripheral edge 78 and reducing venting and breakage of the glass sheet G due to defects at the aperture 74.

It should be appreciated that although the stack 80 in FIGS. 2 and 3 is cylindrical in shape to correspond to the shape of hole 72 and aperture 74, stack 80 may be of any shape that can be secured to the inner surface 84 of wall 36 and effectively seal the hole 72 from the vacuum.

As an alternative, a low heat capacity material such as molded Duro Temp ® material available from Duro Temp Corp., Ohio may be secured with, for example, Dow Corning 736 Silastic ® RTV to the inner surface 84 of wall 36 to seal tha hole 74 from the vacuum. Care must be taken to ensure that the material will remain secured to the wall 36 throughout the thermal cycling that may occur from the repeated pressing of the hot glass sheets G.

The form of the invention shown and described in this disclosure represents an illustrative preferred embodiment thereof. It is understood that various changes may be made without departing from the gist of the invention except in so far as defined in the claimed subject matter that follows.

We claim:

1. An apparatus for press bending heat softened glass sheets having at least one aperture of the type including means to heat said sheets to their heat softened temperature, a first vacuum mold with an apertured lower wall having a sheet engaging surface conforming to the final desired shape of said sheet, a second mold with an engaging surface complementing at least a portion of said sheet engaging surface of said first mold wherein said heat softened glass sheet is sandwiched in pressing engagement therebetween, means to convey said heat softened sheet from said heating means to said molds and means to draw a vacuum through said first mold, the improvement comprising:
   a hole in said engaging surface of said vacuum mold positioned adjacent said aperture in said heat softened glass sheet in facing relation thereto; and
   means to seal said hole to prevent vacuum from being drawn therethrough, said sealing means spaced from said engaging surface of said first mold.

2. The apparatus as in claim 1 wherein the edge of said hole in said engaging surface is spaced radially outward from the edge of said aperture in said heat softened glass.

3. The apparatus as in claim 2 wherein said sealing means include a hollow stack member with a first end secured to the inner surface of said lower wall and a cap member secured to the opposite end wherein said stack extends away from said engaging surface of said lower wall.

4. The apparatus as in claim 2 wherein said sealing member includes a plate member secured to the inner surface of said lower wall.

5. The apparatus as in claim 4 wherein said plate member is a low heat capacity material.

6. The apparatus as in claim 3 wherein said second mold engaging surface includes a hole positioned adjacent to said aperture in said glass sheet in facing relation thereto.

7. The apparatus as in claim 3 wherein said first mold is an upper mold and said second mold is a lower mold wherein said upper mold is vertically aligned with said lower mold.

8. An apparatus for press bending heat softened glass sheets having at least one aperture comprising:
   a first full surface vacuum mold with a lower wall having a sheet engaging surface conforming to the final desired shape of said sheet;
   a hole in said sheet engaging surface aligned with and in facing relation to said aperture in said glass sheet; and
   means spaced from said engaging surface to seal said hole and prevent vacuum from being drawn therethrough.

9. The apparatus as in claim 8 wherein the perimeter of said hole in said engaging surface is positioned radially outwardly from the perimeter of said aperture in said heat softened glass sheet.

10. The apparatus as in claim 9 wherein said sealing means includes a stack member having a hollow member with a first end secured generally about the perimeter of said hole in said engaging surface and a cap member secured to the opposite end of said hollow member wherein said stack member axtends away from said engaging surface of said mold.

11. The apparatus as in claim 8 wherein said sealing means includes a plate member secured to the inner surface of said lower wall of said mold.

12. The apparatus as in claim 11 wherein said plate member is a low heat capacity material.

13. The apparatus as in claim 10 wherein said mold is a first mold and further including a second mold with a sheet engaging surface generally complementing a portion of the sheet engaging surface of said first mold wherein said heat softened glass sheet is sandwiched in pressing engagement between said first and second molds.

14. The apparatus as in claim 13 wherein said first mold is an upper mold and said second mold is a lower mold, said first mold being vertically aligned with said lower mold.

15. The apparatus as in claim 14 wherein said sheet engaging of said second mold includes a hole positioned adjacent to said operation in said glass sheet in facing relation thereto.

16. A method of shaping a heat softened glass sheet having at least one aperture comprising:
   heating said glass sheet to its heat softened temperature;
   providing a hole in a shaping surface of a vacuum mold;
   aligning said sheet with said shaping surface of said vacuum mold to align said hole in said shaping surface with said aperture in said glass sheet;
   engaging said glass sheet with said shaping surface;
   drawing a vacuum through said vacuum mold to hold said shaped glass sheet thereagainst; while
   sealing said hole in said shaping surface so as to prevent vacuum from being drawn therethrough.

17. The method as in claim 16 wherein said mold is a first mold and further including a second mold with an engaging surface generally complementing the shaping surface of said first mold and further including the steps of sandwiching said heat softened glass sheet between said first and second molds.

18. The method as in claim 17 further including the step of providing a hole in the engaging surface of said second mold, said hole generally aligned with said aperture in said glass sheet and said hole in said shaping surface of said first mold.

* * * * *